(12) United States Patent
Cashman

(10) Patent No.: US 7,698,592 B2
(45) Date of Patent: Apr. 13, 2010

(54) APPARATUS AND METHOD FOR CONTROLLING RAID ARRAY REBUILD

(75) Inventor: Paul Nicholas Cashman, Alton (GB)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/761,218

(22) Filed: Jun. 11, 2007

(65) Prior Publication Data

US 2008/0010503 A1    Jan. 10, 2008

(30) Foreign Application Priority Data

Jun. 23, 2006    (GB) .................................... 0612482

(51) Int. Cl.
*G06F 11/00* (2006.01)
(52) U.S. Cl. ............... 714/6; 714/7; 714/4; 370/223
(58) Field of Classification Search ............... None
See application file for complete search history.

(56) References Cited

U.S. PATENT DOCUMENTS

| | | | | | |
|---|---|---|---|---|---|
| 5,317,569 | A | * | 5/1994 | Ralph et al. ................ 370/223 |
| 6,128,750 | A | * | 10/2000 | Espy et al. .................... 714/7 |
| 6,477,591 | B1 | * | 11/2002 | VanderSpek ................ 710/38 |
| 6,684,292 | B2 | * | 1/2004 | Piccirillo et al. ............ 711/106 |
| 6,766,469 | B2 | * | 7/2004 | Larson et al. ................. 714/7 |
| 6,795,934 | B2 | * | 9/2004 | Nagata et al. ................. 714/8 |
| 7,246,262 | B2 | * | 7/2007 | Nagata et al. ................. 714/8 |
| 7,549,112 | B2 | * | 6/2009 | Terry et al. ............... 714/790 |
| 7,565,566 | B2 | * | 7/2009 | Davies et al. ................. 714/4 |
| 2001/0039632 | A1 | * | 11/2001 | MacLaren et al. ............. 714/6 |
| 2002/0002440 | A1 | * | 1/2002 | Sakai .......................... 702/35 |
| 2003/0005352 | A1 | * | 1/2003 | Beer et al. .................... 714/4 |
| 2005/0102549 | A1 | * | 5/2005 | Davies et al. ................. 714/4 |
| 2009/0199042 | A1 | * | 8/2009 | Ishikawa et al. .............. 714/7 |

* cited by examiner

*Primary Examiner*—Christopher S McCarthy
(74) *Attorney, Agent, or Firm*—Kunzler & McKenzie

(57) ABSTRACT

An apparatus and method are disclosed for rebuilding a data storage array having plural communication paths. A first error detecting component detects an error at a data storage device of a data storage array. The data storage device has a plurality of ports and is operable to provide data for a preemptive rebuild. A port control component disables all but a single port of the data storage device. A preemptive rebuild component copies data from the data storage device to a spare data storage device using the single operational port. An alternative path maintenance component maintains an alternative communication path for use by other members of the data storage array and bypasses the data storage device. A second error detecting component detects an error at the data storage device during operation of the preemptive rebuild component. A device disabling component disables the data storage device after detecting a second error.

20 Claims, 4 Drawing Sheets

APPARATUS AND METHOD FOR CONTROLLING RAID ARRAY REBUILD

CROSS-REFERENCES TO RELATED APPLICATIONS

This application claims priority to the Patent Application Number 0612482.0 entitled "Apparatus and Method for Controlling RAID Array Rebuild" filed in Great Britain and filed on Jun. 23, 2006 for Paul Nicholas Cashman, which is incorporated herein by reference.

BACKGROUND OF THE INVENTION

1. Field of the Invention

The present invention relates to technology for controlling array rebuild, and in particular to a technology for maintaining availability of data during a potentially failing array rebuild.

2. Description of the Related Art

In certain arrangements of Redundant Arrays of Inexpensive Disks (RAID arrays), facilities are provided for rebuilding data from a failed disk using data from other disks in the array. This is usually achieved by distributing (striping) copies of data from each disk across the other disks in the array, so that it can be retrieved and assembled together on a spare disk if a disk fails. More recently, the concept of a preemptive rebuild has been developed. In this case, a disk that is determined to be at the point of failure (as detected by, for example, a count of transient or recoverable errors that reaches a predetermined threshold that indicates an impending total failure of the disk) is preemptively copied over to a spare before the impending failure can occur.

During RAID array rebuilds, failing hardware and firmware may encounter repetitive errors that prevent array rebuilds from completing and that may result in loss of access to data. Stated in more detail, the disk drive module firmware may indicate a predictive failure as described above, on the basis of, for example, an error thresholding mechanism. This indication in turn may be used to initiate a preemptive data rebuild from the failing component to another component, in order to improve system availability by reducing the time taken to prepare the spare disk drive module, and also to reduce the possibility of data loss—if the preemptive data rebuild is done successfully, there is no need to use the conventional technique of reading data back from all the other array components.

If, during the preemptive data migration, an error occurs that causes RAID operation failures, the recovery may be compromised. This is because, unless there is some higher level of control, the system-specified recovery action may be to continue to retry, which will merely repeat the action that failed. Such a repetition may ultimately result in loss of access to data or even in loss of the data itself.

An example of one known approach to the problem of maintaining data availability during RAID array rebuild is to delay rebuild recovery until the controlling software indicates that it is ready to allow such recovery. This approach, although it may have acceptable results in some circumstances, depends on the rebuild action itself being the cause of the error. In one alternative, it may be possible to have a mechanism wherein array components can be ignored before they have been initialized. However, this is also prone to error as the drive that has been predicted to be at the point of failure for one reason may fail for a different, unforeseen reason. A further alternative would be to bypass failing disk drive modules using out of band signaling. However, this is expensive in resource use and may not be technically possible (as would be the case, for example, if communications were routed over long fiber channel arbitrated loop ("FC-AL") cables). Using multiple controllers is also unlikely to provide any benefit because, as they are likely to be running the same code, they may be subject to the same errors. Furthermore, it would be prohibitively expensive to write completely independent solutions for use on different controllers.

It would thus be desirable to have a technological means for controlling RAID array rebuild, and in particular to have a technological means for maintaining availability of data during a potentially failing array rebuild, without incurring excessive additional development cost.

SUMMARY OF THE INVENTION

The present invention accordingly provides, in a first aspect, An apparatus for controlling a storage array having plural communication paths, comprising: a first error detecting component for detecting an error at a device having plural ports and operable to provide data for preemptive rebuild; a port control component for disabling all but a single one of said plural ports at said device; a preemptive rebuild component for copying data from said device to a spare device using said single one of said plural ports at said device; an alternative path maintenance component for maintaining an alternative path for use by other members of said storage array and bypassing said device; a second error detecting component for detecting an error at said device during operation of said preemptive rebuild component; and a device disabling component responsive to said second error detecting component for disabling said device.

The apparatus preferably further comprises a non-preemptive rebuild component for rebuilding data at a spare using data from said other members of said storage array and said alternative path bypassing said device.

Preferably, said non-preemptive rebuild component for rebuilding data at a spare using data from said other members of said storage array comprises a RAID rebuild component for reconstructing data from XORed data striped across said members of said storage array.

Preferably, said first error detecting component, said port control component, said preemptive rebuild component, said alternative path maintenance component, said second error detecting component, and said device disabling component are incorporated in a device controller.

In a second aspect, the present invention provides a method or logic arrangement for controlling a storage array having plural communication paths, comprising the steps of: detecting an error by a first error detecting component at a device having plural ports and operable to provide data for preemptive rebuild; disabling all but a single one of said plural ports at said device; copying data from said device to a spare device using said single one of said plural ports at said device; maintaining an alternative path for use by other members of said storage array and bypassing said device; detecting an error by a second error detecting component at said device during operation of said preemptive rebuild component; and responsive to said step of detecting an error by a second error detecting component, disabling said device.

The method preferably further comprises the step of rebuilding data at a spare using data from said other members of said storage array and said alternative path bypassing said device.

Preferably, said step of rebuilding data at a spare using data from said other members of said storage array comprises reconstructing data from XORed data striped across said members of said storage array.

Preferably, said steps are incorporated in device controller logic.

In a third aspect, there is provided a data carrier having functional data thereon, said functional data comprising functional computer data structures to, when loaded into a computer system and operated upon thereby, enable said computer system to perform all the steps of a method according to the second aspect.

In a fourth aspect, there is provided a computer program comprising computer program code to, when loaded into a computer system and executed thereon, cause said computer system to perform all the steps of a method according to the second aspect.

Preferred embodiments of the invention thus contemplate, in their broadest aspect, a technical framework for controlling array rebuild, and in particular and in particular for maintaining availability of data during a potentially failing array rebuild.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
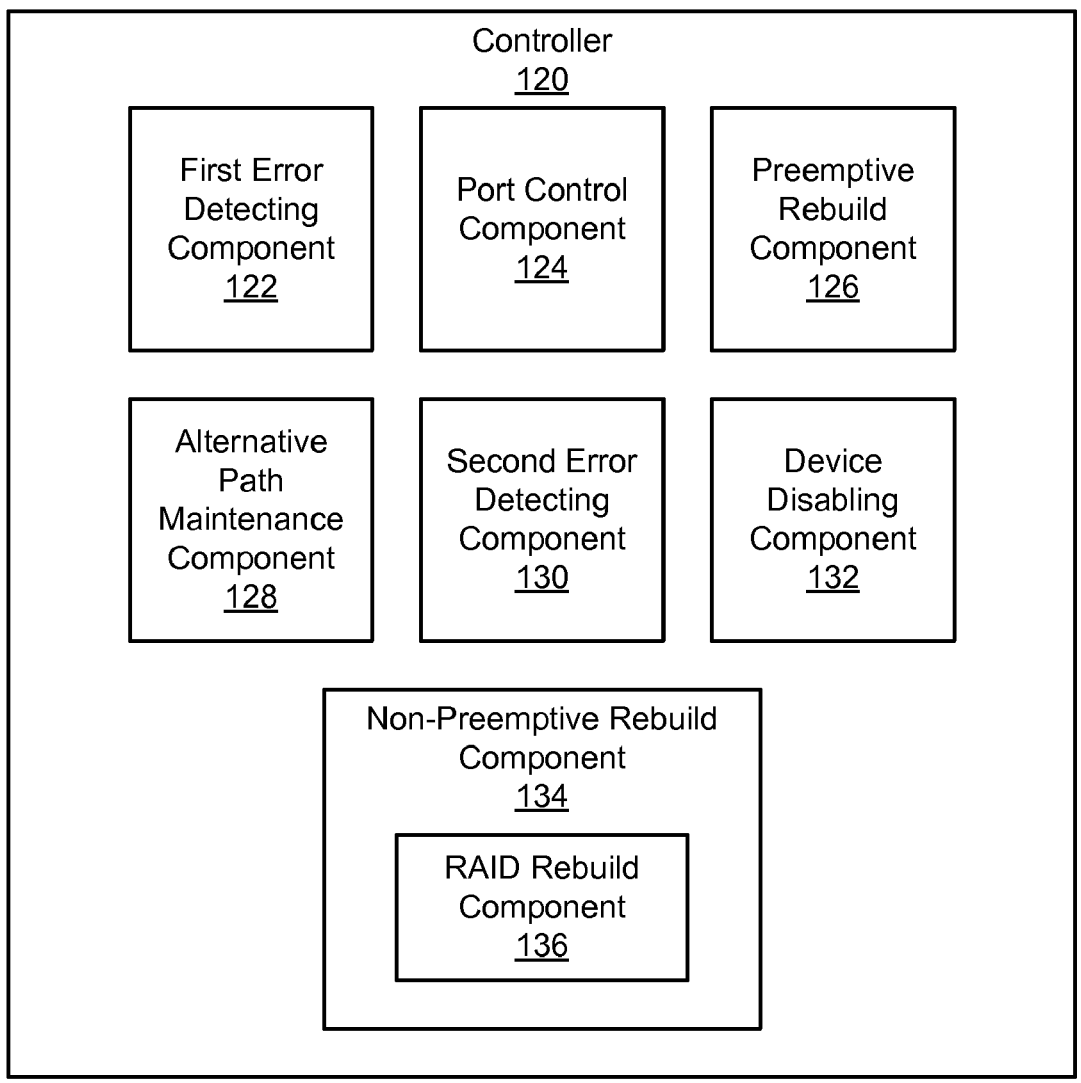
FIG. 1 is a schematic block diagram illustrating one embodiment of a an apparatus for controlling RAID array rebuild in an initial state in accordance with the present invention.
Figure 1:
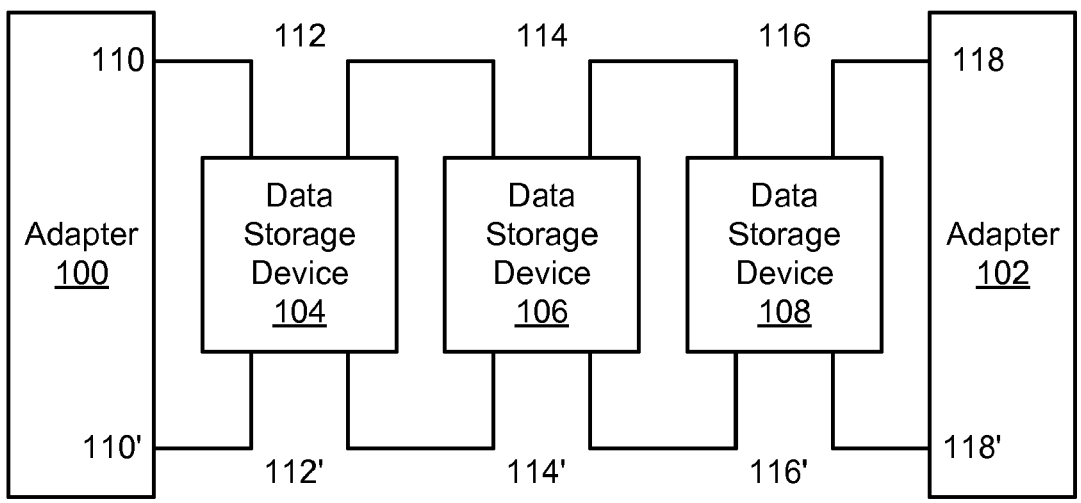

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The preferred embodiment of the invention is suitably implemented in a storage system that has:
1. Redundant communication paths to disk drive modules; and
2. A controlling component adapted to selectively disable the use of communication paths to disk drive modules.

When a component is in a position where it can be used as a source for pre-emptive data rebuild to a spare device (by, for example, the SmartRebuild facility as embodied in IBM's family of storage products), the controlling component disables access to all but one of the disk drive module's ports. Should a subsequent failure of the disk drive module occur, such that the data rebuild is compromised, the controlling component is operable to bypass the sole remaining port that was being used to access the disk drive module, at the controller interface, and then to completely restore the subsystem except for the disk drive module that was being copied and that has now failed. This in effect removes the failed disk drive module completely from the system, restores system stability and allows the system to completely bypass the disk drive module and to restore full redundancy to the rest of the components using conventional rebuild techniques, such as are well-known in the field of RAID storage systems. This is a significant improvement on the situation according to the prior art, in which access to all data is lost until an engineer can remove the failed disk drive module physically and then restore system activity.

The disk drive module according to the preferred embodiment of the present invention is accessed by one or more controllers via multiple ports, using, for example, fiber channel arbitrated loop ("FC-AL") or serial attached small computer system interface ("serial attached SCSI" or "SAS"). When the disk drive module reports an error caused by a failure that a preemptive, intelligent rebuild facility can potentially handle, the controlling system first selects a single communication path to the disk drive module—the selection can be based on known possible redundancy issues, as will be clear to one of ordinary skill in the art—and bypasses all other communication paths to that disk drive module. Then the preemptive, intelligent rebuild facility can be activated using the sole remaining communication path. The data is copied from the disk drive module to a spare disk drive module, and the process is monitored for any subsequent error indications. Should a further failure occur, as determined by a monitoring component, the controller can bypass the disk drive module using one or more of the communication paths that do not include the failed disk drive module's remaining enabled port. Data can then be reconstructed using conventional RAID rebuild techniques.

Turning to FIG. 1, which shows apparatus in accordance with one preferred embodiment of the present invention, there is shown an arrangement of components comprising a pair of adapters 100, 102, operatively connected in a loop topology with devices 104, 106, 108. Also shown is the pair of communication paths connecting adapters and devices, the first communication path through adapter ports 110, 118 and device ports 112, 114, 116, and the second communication path through adapter ports 110', 118' and device ports 112', 114', 116'. (For simplicity, only two paths are shown, and only two ports per adapter and device. It will be clear to one of skill in the art that a plurality of paths and ports may be operated in line manner.) In normal operation, that is, until an error (or a series of errors leading to a threshold exceeded condition) is reported, both communication paths are available, and all the above-referenced ports are enabled.

Figure 2:
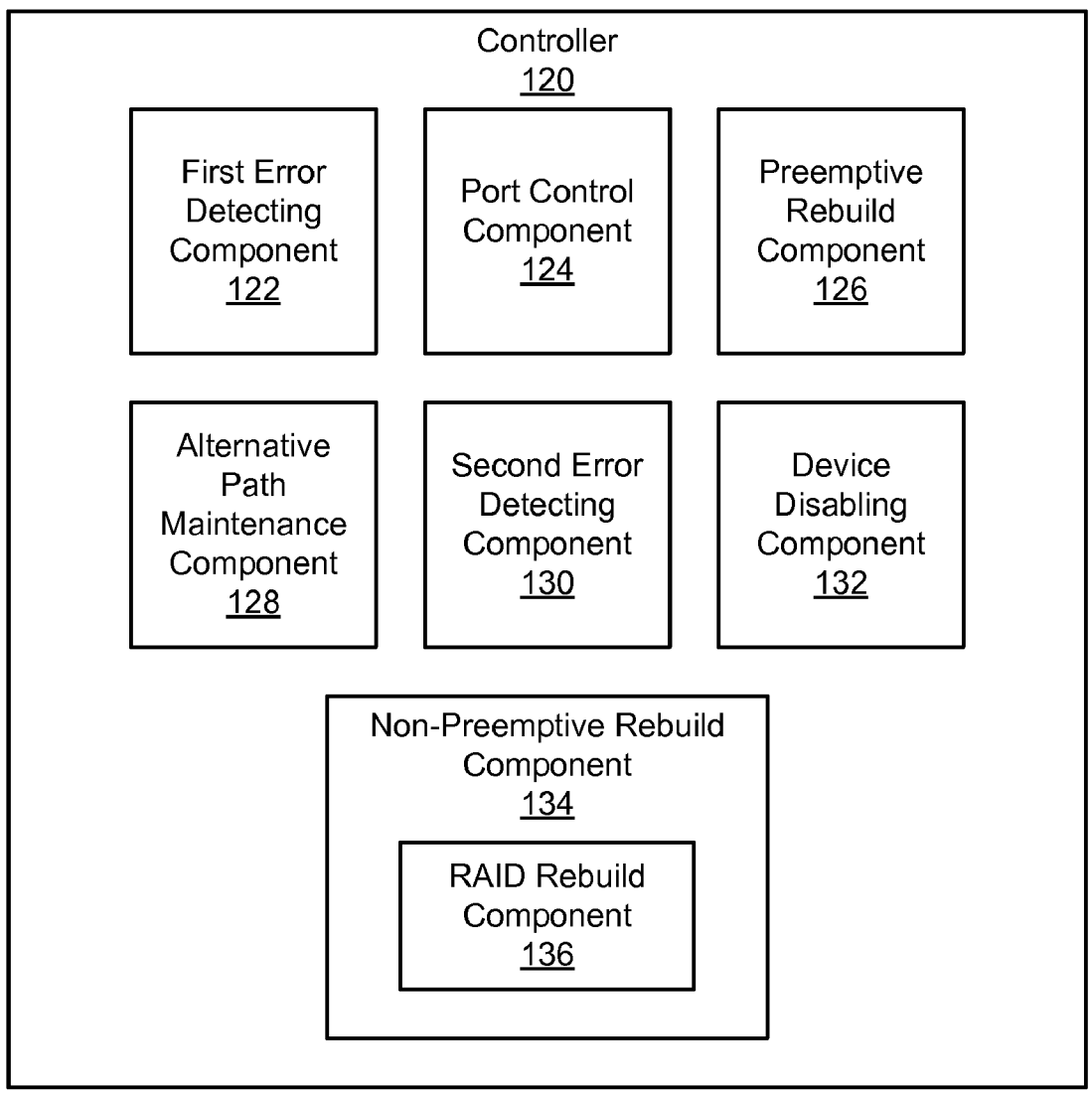
FIG. 2 is a schematic block diagram illustrating one embodiment of a an apparatus for controlling RAID array rebuild in a first modified state in accordance with the present invention.
Figure 2:
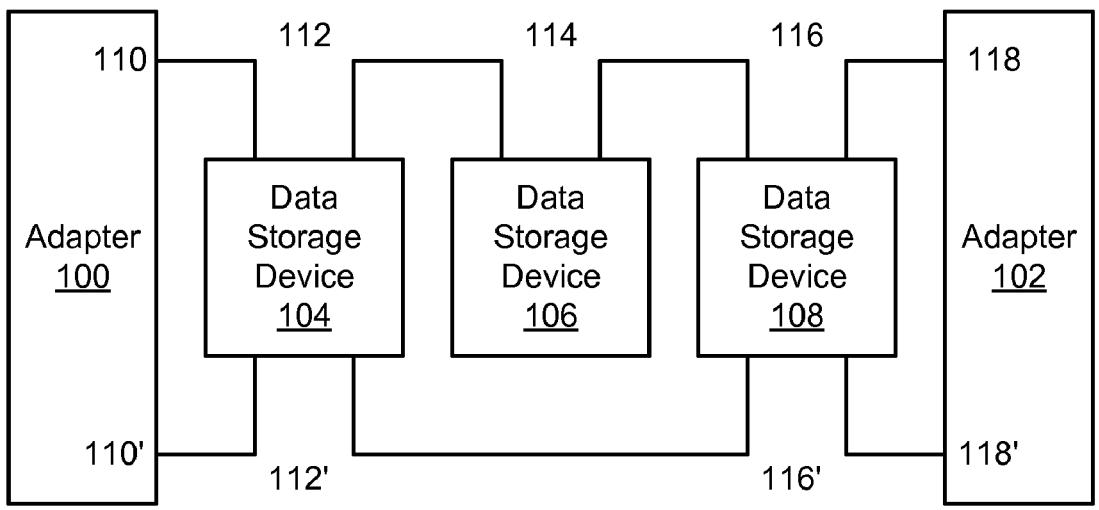

Turning now to FIG. 2, there is shown the same arrangement of components comprising adapters 100, 102, in a loop topology with devices 104, 106, 108. Also shown is the pair of communication paths connecting adapters and devices, the first communication path through adapter ports 110, 118 and device ports 112, 114, 116. However the second communication path through adapter ports 110', 118' is now routed only through device ports 112', 116'. The arrangement shown in FIG. 2 has arisen as follows: on receipt of an error report (or a notification of a series of errors leading to a threshold exceeded condition) from device 106, port 114' has been disabled, and traffic using the second communication path now passes over adapter ports 110', 118' and device ports 112', 116'. Normally, the preemptive rebuild operation for device 106 now proceeds using port 114 to pass the data from device 106 to a spare device (which might, for example, be one of devices 104, 108) until it completes successfully, which need not be described here, as it will be clear to one of ordinary skill in the art who is familiar with the notion of preemptive rebuild. If, however, a further, unrecoverable error occurs at device 106 during this preemptive rebuild process, the device is placed in a failed condition. Traffic over adapter ports 110 and 118 is stopped. Communications traffic involving adapters 100, 102 and devices 104, 108 is uninterrupted and continues using adapter ports 110', 118' and device ports 112', 116'. Port 114 at device 106 is bypassed, so that device 106 is completely isolated, and communications traffic can resume over adapter ports 110, 118 and device ports 112, 116.

Figure 3:
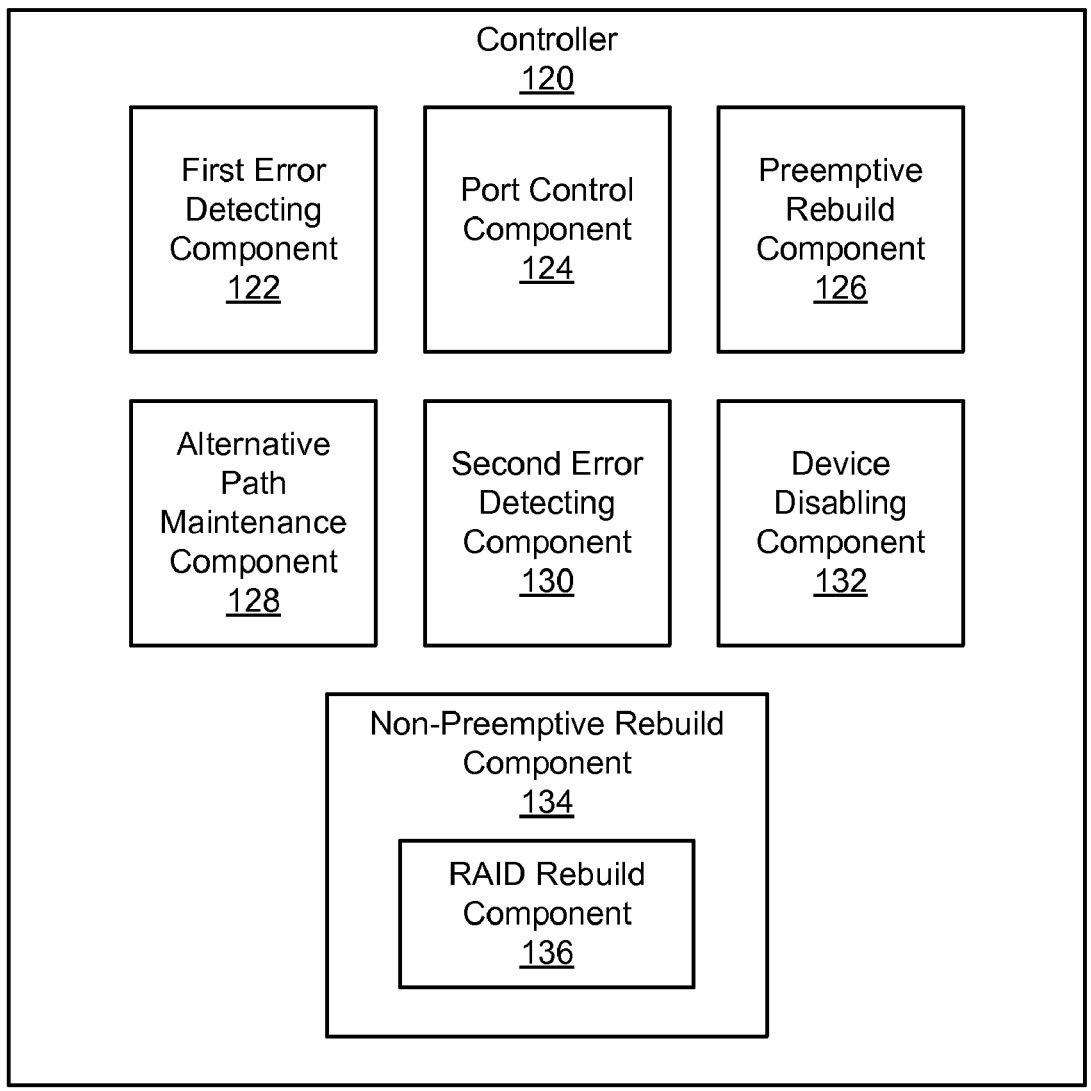
FIG. 3 is a schematic block diagram illustrating one embodiment of a an apparatus for controlling RAID array rebuild in a second modified state in accordance with the present invention.
Figure 3:
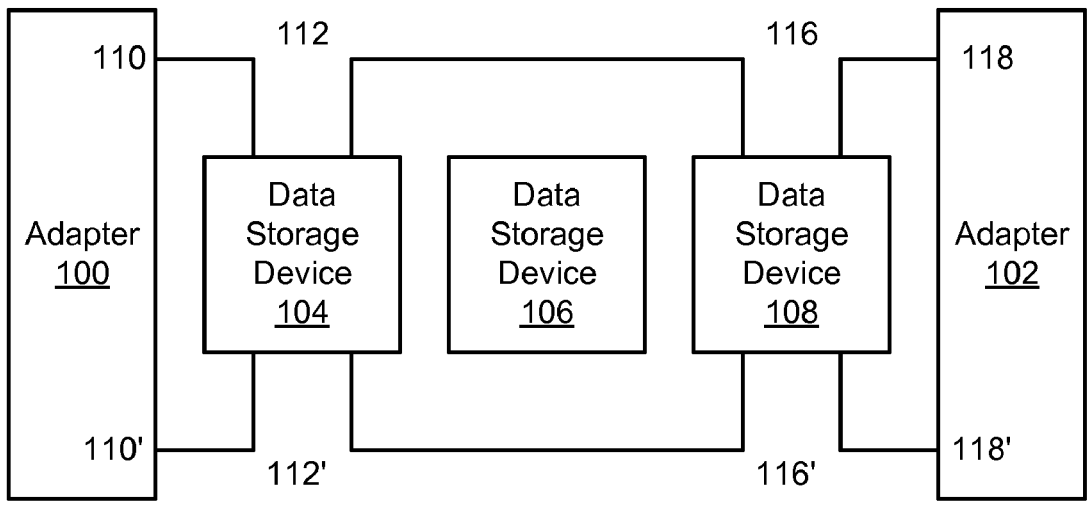

This results in an arrangement as shown in FIG. 3, in which device 106 is fully isolated and redundancy of communications has been restored for the remaining adapters and devices. The system reverts to the conventional rebuild techniques well known to one of ordinary skill in the art; for example, the rebuild of RAID data for a fully failed and isolated storage device on an array spare device using the copies of the data from the other members of the array. This is usually accomplished using XORed data from data stripes arranged across the array.

The preferred embodiment of the present invention in the form of an apparatus thus advantageously addresses the problem of providing a technical framework for controlling RAID array rebuild, and in particular for maintaining availability of data during a potentially failing array rebuild.

Figure 4:
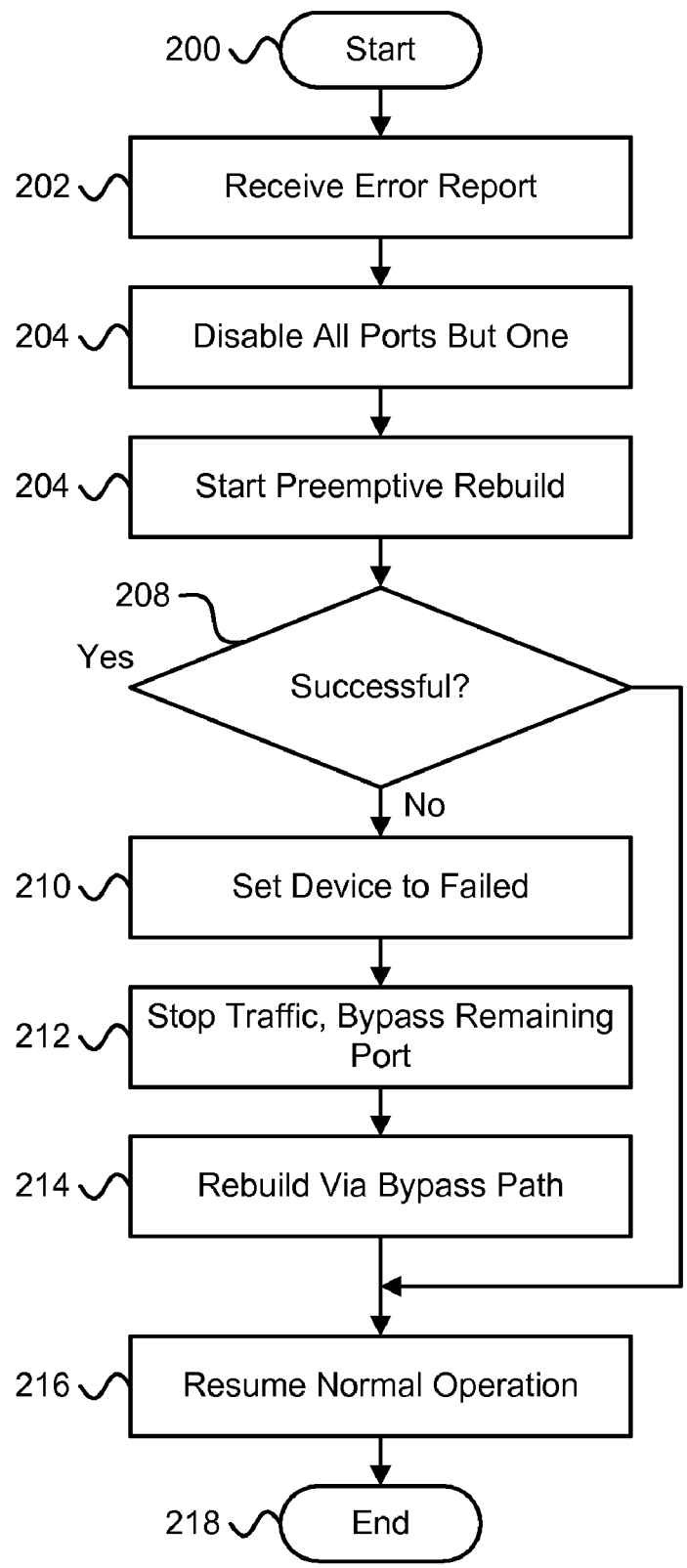
FIG. 4 is a schematic flow chart diagram illustrating one embodiment of a method for controlling RAID array rebuild in accordance with the present invention.

Turning now to FIG. 4, there are shown in flowchart form the steps of a method or logic arrangement according to a preferred embodiment of the present invention. In FIG. 4, the method or logic arrangement includes steps beginning at START step 200, and at step 202, an error report (or a notification of a series of errors leading to a threshold exceeded condition) is received. At step 204, responsive to step 202, all but one of the ports at the device in error is disabled, and at step 206, the preemptive rebuild of the data is begun, using the sole remaining port at the device in error to communicate the necessary data for rebuild on the spare device. If at step 208, the preemptive rebuild is determined to have completed successfully, normal operation against the restored array is resumed at step 214, and the process completes at END step 216. If at step 208, the preemptive rebuild is determined to have encountered a further, unrecoverable error, or if error thresholding indicates that the preemptive rebuild must fail, the device is placed in failed state at step 210. At step 212, traffic over the path that includes the sole remaining port of the failed device is stopped, that port is bypassed, and traffic can then be resumed over the path, which now bypasses the failed device. At step 214, a normal RAID rebuild begins using a bypass path, and at step 216, the normal RAID rebuild completes and normal operation against the array resumes. The process completes at END step 218.

The preferred embodiment of the present invention in the form of a method or logic arrangement thus advantageously addresses the problem of providing a technical framework for controlling RAID array rebuild, and in particular for maintaining availability of data during a potentially failing array rebuild.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the method.

It will be clear to one skilled in the art that many improvements and modifications can be made to the foregoing exemplary embodiment without departing from the scope of the present invention.

What is claimed is:

1. An apparatus to rebuild a data storage array having plural communication paths, the apparatus comprising:
   a first error detecting component configured to detect an error at a data storage device of a data storage array, the data storage device having a plurality of ports and operable to provide data for a preemptive rebuild;
   a port control component configured to disable all but a single port of the plurality of ports of the data storage device;
   a preemptive rebuild component configured to copy data from the data storage device to a spare data storage device using the single operational port of the plurality of ports of the data storage device;
   an alternative path maintenance component configured to maintain an alternative communication path for use by other members of the data storage array and to bypass the data storage device for non-preemptive rebuild related communication;
   a second error detecting component configured to detect an error at the data storage device during operation of the preemptive rebuild component; and
   a device disabling component responsive to the second error detecting component configured to disable the data storage device.

2. The apparatus of claim 1, further comprising a non-preemptive rebuild component configured to rebuild data at the spare data storage device using data from the other members of the data storage array and using an alternative path that bypasses the data storage device disabled by the device disabling component.

3. The apparatus of claim 2, wherein the non-preemptive rebuild component comprises a RAID rebuild component for reconstructing data from exclusive ORed ("XORed") data striped across the other members of the data storage array.

4. The apparatus of claim 2, wherein the non-preemptive rebuild component rebuilds data at the spare data storage device using data from the other members of the data storage array for data not rebuilt by the preemptive rebuild component.

5. The apparatus of claim 1, wherein the first error detecting component, the port control component, the preemptive rebuild component, the alternative path maintenance component, the second error detecting component, and the device disabling component are incorporated in a device controller.

6. The apparatus of claim 1, wherein the data storage array comprises a RAID array and the data storage device and the other members of the data storage array comprise data storage devices of the RAID array.

7. A system to rebuild a data storage array having plural communication paths, the system comprising:
   a data storage device and at least one other data storage device comprising a data storage array, each data storage device comprising a plurality of communications ports; and
   a controller in communication with the data storage devices of the data storage array, the controller comprising
      a first error detecting component configured to detect an error at the data storage device, the data storage device operable to provide data for a preemptive rebuild;
      a port control component configured to disable all but a single port of the plurality of ports of the data storage device;
      a preemptive rebuild component configured for a preemptive rebuild, the preemptive rebuild comprising copying data from the data storage device to a spare data storage device using the single operational port of the plurality of ports of the data storage device;

an alternative path maintenance component configured to maintain an alternative communication path for use by the at least one other data storage device of the data storage array and to bypass the data storage device for non-preemptive rebuild related communications;

a second error detecting component configured to detect an error at the data storage device during operation of the preemptive rebuild component; and a device disabling component responsive to the second error detecting component configured to disable the data storage device.

8. The system of claim 7, further comprising a plurality of controllers in communication with the data storage array and configured for preemptive rebuild operations of the data storage device.

9. The system of claim 7, wherein the data storage devices of the data storage array communicate over one of a fiber channel arbitrary loop ("fc-al") and a serial attached small computer system interface ("serial attached SCSI" or "SAS").

10. The system of claim 7, further comprising one or more adapters configured to facilitate communication with the data storage devices of the data storage array.

11. The system of claim 7, wherein the data storage array comprises a redundant array of independent disks ("RAID") array.

12. The system of claim 7, further comprising a non-preemptive rebuild component configured to rebuild data at the spare data storage device using data from the other members of the data storage array and the alternative path bypassing the data storage device disabled by the device disabling component.

13. The system of claim 12, wherein the non-preemptive rebuild component comprises a RAID rebuild component for reconstructing data from exclusive ORed ("XORed") data striped across the other members of the data storage array.

14. The system of claim 7, wherein the controller at least one of the first error detecting component, the port control component, the preemptive rebuild component, the alternative path maintenance component, the second error detecting component, and the device disabling component are part of a SmartRebuild facility.

15. A computer program product comprising a computer readable storage medium having computer usable program code executable to perform operations for rebuilding a data storage array having plural communication paths, the operations of the computer program product comprising: detecting an error at a data storage device of a data storage array, the data storage device having a plurality of ports and operable to provide data for a preemptive rebuild; disabling all but a single port of the plurality of ports of the data storage device; copying data from the data storage device to a spare data storage device using the single operational port of the plurality of ports of the data storage device; maintaining an alternative communication path for use by other members of the data storage array and to bypass the data storage device for non-preemptive rebuild related communication; detecting an error at the data storage device while copying data from the data storage device to a spare data storage device; and disabling the data storage device responsive to detecting an error at the data storage device while copying data from the data storage device to a spare data storage device.

16. The computer program product of claim 15, further comprising rebuilding data at a spare data storage device using data from the other members of the data storage array and using an alternative path that bypasses the data storage device with all but a single data port disabled.

17. The computer program product of claim 16, wherein rebuilding data at a spare data storage device further comprises reconstructing data from exclusive ORed ("XORed") data striped across the other members of the data storage array.

18. The computer program product of claim 16, wherein rebuilding data at a spare data storage device further comprises rebuilding data at the spare data storage device using data from the other members of the data storage array for data not rebuilt from the data storage device.

19. A method for deploying a preemptive rebuild computer program for rebuilding a data storage array having plural communication paths, the method comprising:

detecting an error at a data storage device of a data storage array, the data storage device having a plurality of ports and operable to provide data for a preemptive rebuild;

disabling all but a single port of the plurality of ports of the data storage device;

copying data from the data storage device to a spare data storage device using the single operational port of the plurality of ports of the data storage device;

maintaining an alternative communication path for use by other members of the data storage array and to bypass the data storage device for non-preemptive rebuild related communication;

detecting an error at the data storage device while copying data from the data storage device to a spare data storage device; and disabling the data storage device responsive to detecting an error at the data storage device while copying data from the data storage device to a spare data storage device.

20. The method of claim 19, further comprising:

determining customer requirements for data storage rebuilding;

configuring a data storage array comprising data storage devices with a plurality of communication ports; and installing the preemptive rebuild computer program on a controller for the data storage array, the preemptive rebuild computer program comprising the steps of claim 19.

* * * * *